July 25, 1950

A. A. H. N. SCOTT 2,516,428

RELEASABLE COUPLING MEANS FOR CONNECTING
RELATIVELY MOVABLE PARTS OR ELEMENTS
DISPOSED ABOUT A COMMON AXIS
Filed April 30, 1948

Inventor:
A. A. H. N. Scott
By E. F. Wenderoth
Atty

Patented July 25, 1950

2,516,428

UNITED STATES PATENT OFFICE 2,516,428

RELEASABLE COUPLING MEANS FOR CONNECTING RELATIVELY MOVABLE PARTS OR ELEMENTS DISPOSED ABOUT A COMMON AXIS

Alfred A. H. N. Scott, Malvern, Victoria, Australia

Application April 30, 1948, Serial No. 24,388
In Australia July 1, 1947

4 Claims. (Cl. 287—54)

This invention relates to releasable coupling means for connecting parts or elements which are angularly movable, or adjustable about a common axis, and it has been devised to enable such parts or elements to be firmly connected and readily disconnected for relative angular movement or adjustment.

The principal objective of the invention is the provision of coupling means for the abovementioned purpose which is of simple and durable construction and efficient in use, and which may be readily released for relative adjustment or movement of the parts connected by it and re-engaged at the termination of the adjustment or movement to securely reconnect the parts.

In achieving the above stated principal objective and according to the invention, coupling means for the purpose specified, comprise inner and outer members disposed about a common axis, one of the contiguous surfaces of the inner and outer members being cylindrical and the other contiguous surface having at least one inclined portion angularly disposed to the cylindrical surface, at least one ball or roller between the cylindrical surface and the inclined portion, means for thrusting the ball or roller for gripped engagement between the inclined portion and the contiguous cylindrical surface to effect a locked connection of the inner and outer members, and means for releasing the ball or roller from gripped engagement to disconnect the inner and outer members.

The means for thrusting the ball or roller into engagement with the circumferentially inclined portion and the contiguous cylindrical surface comprise a spring or springs, and the means for releasing the ball or roller may comprise a lever, dual levers, a slidably actuated wedge, or an appropriately shaped cam.

In an arrangement wherein a multiple number of balls or rollers and corresponding number of coacting ball or roller gripping surfaces are employed, the means for releasing the balls or rollers may be arranged to actuate one or more balls or rollers simultaneously. Such means may be operated by a manually rotatable ring or band disposed about the outer member.

The means for engaging or disengaging the balls or rollers may be operated directly by hand or in some cases by remote control means through a suitable linkage or other connecting means.

In the coupling means above broadly outlined, the outer member may be connected with one of the parts to be relatively adjusted, while the inner member is connected with the other of said parts.

Either the inner or the outer member may be fixed or stationary, while the coacting member may be movable relatively to the fixed member.

Thus, for instance, the outer member may comprise the hub or boss of a lever, such as the hand brake lever of an automobile, and the inner member may comprise a fixed shaft or pin upon which the hub or boss is pivotally supported. In this case, an arm is secured to the hub or boss and is connected to the brakes or mechanism to be actuated, and the hand lever, the hub or boss and the arm are rotatable as a unit upon the fixed pin or shaft. In the inner surface of the hub or boss is formed a ramp, and between the latter and the surface of the fixed shaft there is interposed a spring-influenced roller.

In such an arrangement, the hand lever may be readily moved in one direction to apply the brakes, but reverse movement is opposed by the gripping of the roller between the ramp and the fixed shaft, so that the brakes are maintained in the "on" position if required. To release the brakes, the roller is displaced from the gripped position by a push rod slidable through the hub or boss and operated by a hand grip on the brake lever.

As above stated, the outer member may be fixed or stationary, while the inner member may be movable.

An example of such an alternative arrangement is afforded by coupling means according to the invention to adjustably connect the handle bar with the steering pillar of a bicycle, in which the outer member is secured to the steering pillar and the handle bar comprises the inner movable or adjustable member.

The invention will be better understood from the description of the several practical embodiments depicted in the accompanying drawings, wherein.

Figure 1:
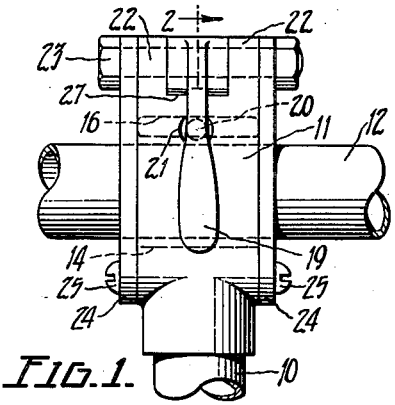
Fig. 1 is a front elevation of an adjustable clamp for the handle or steering bar of a bicycle.
Figure 2:
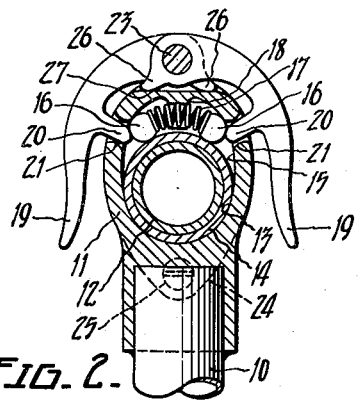
Fig. 2 is a transverse section on the line 2—2 of Fig. 1.

Referring, firstly, to Figs. 1 and 2 the numeral 10 designates the steering pillar of a bicycle having integrally united therewith as by brazing or welding, a housing 11 through which extends the handle bar 12.

Secured to the handle bar 12 and rotatably fitting the inner surface 13 of the lower part of the housing 11 is a sleeve 14, and extending from and continuous with the inner surface 13 are circumferentially inclined ramps 15 which are angularly disposed to the periphery of the sleeve 14.

Interposed between the sleeve 14 and the ramps 15, are rollers 16 between which is positioned a spring 17 extending through an aperture in a guide lug 18 formed integrally with the housing 11.

It will be apparent that the rollers 16 under influence of the spring 17 are forced into the angular space between the periphery of the sleeve 14 and the ramps 15, so that the rollers are jammed or wedged between the sleeve and ramps and thereby lock the sleeve and therewith the handle bar 12 against rotary movement.

In order to release the sleeve and handle bar, it is necessary to move the rollers 16 from the locking or wedged position, and for this purpose there are provided levers 19 having formed thereon lugs 20 which extend through apertures 21 in the housing 11 for engagement with the rollers 16.

The bosses of the levers 19 are fitted between lugs 22 integral with and extending upwardly from the housing 11, and said levers are pivoted upon a bolt 23 passed through the lugs 22, and also through cover plates 24 which comprise closures for the housing and prevent dislodgement of the rollers 16 and endwise movement of the handle bar 12. The cover plates 24 are retained upon the ends of the housing 11 by the bolts 23 and by screws 25 engaged with tapped holes in the housing.

It will be apparent that upon manual application of pressure to the levers 19 towards the housing 11, the lugs 20 are thrust inwardly through the apertures 21 to engage and displace the rollers 16 from locking engagement with the sleeve 14 and ramps 15.

Resultantly, the sleeve 14 and the handle bar 12 are set free for rotation so that the latter may be adjusted to any desired position, and secured therein upon release of the levers 19 and consequent locking re-engagement of the rollers 16 with the sleeve 14 and ramps 15 under influence of the spring 17.

In order to limit the outward movement of the levers 19 from the housing 11, the former are provided with lugs 26 which engage the part 27 of the housing 11 extending between the lugs 22.

Figure 3:
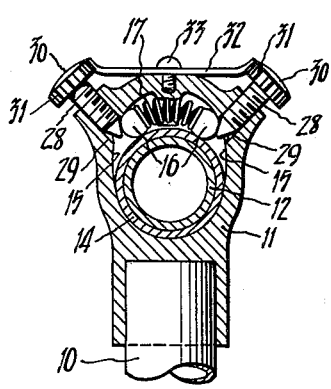
Fig. 3 is a transverse section of a modified adjustable handle bar clamp for a bicycle.

Referring now to Fig. 3, the steering pillar 10, housing 11, handle bar 12, sleeve 14, ramps 15 and spring influenced rollers 16 are constructed as above described, and the ends of the housing are likewise closed by detachable covers (not shown).

The rollers 16 are displaced from locking engagement by manually actuated pointed screws 28, which when screwed inwardly in tapped holes 29, engage and release the rollers 26, thereby setting free the sleeve 14 and handle bar 12 for adjustment as previously described.

In order to prevent inadvertent displacement of the screws 28 from the tapped holes 29, the former are provided with heads 30 having circumferential slots 31 for engagement by a locking spring 32 secured to the housing 11 by a screw 33.

Figure 4:
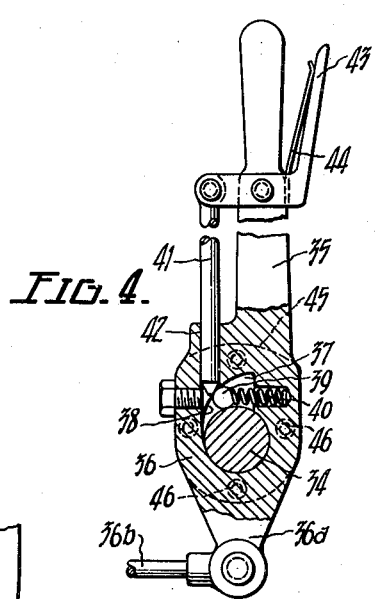
Fig. 4 is a sectional elevation of a pivot shaft and operating lever for an automobile brake.

Attention being now directed to Fig. 4, the numeral 34 indicates a fixed shaft whereon is pivotally supported for angular movement a lever 35, the boss 36 of the latter being rotatably mounted upon the former.

Formed through the interior of the boss 36 is a slot 37, one side of which comprises a ramp 38 inclinably related to the periphery of the shaft 34.

Positioned in the angular space between the shaft 34 and the ramp 38 is a locking roller 39 which by a spring 40 is forcibly thrust between the shaft and ramp.

For the purpose of releasing the roller 39, a pointed push rod 41 is extended through an aperture 42 in the boss 36 in such a position that upon said rod being thrust inwardly through the aperture by operation of a hand grip lever 43, the roller is displaced from the locking position. The hand grip lever 43 and the push rod 41 are maintained in a normal inoperative position, wherein the latter is clear of the roller 39, by a spring 44. Formed integrally with the boss 36 is an arm 36a to which is connected the brake rod 36b.

It will be apparent that upon release of the roller 39, the lever 35 may be rotated about the fixed shaft 34 in the direction of the arrow without restraint to apply a brake (not shown) with with the brake rod 36b is connected, and that upon release of the brake lever 35 by the driver of the vehicle, the brake will be retained in an "on" position by wedging of the roller in the angular space between the ramp 38 and the fixed shaft 34.

Release of the brake is readily effected upon disengagement of the roller 39 from the locking position by operation of the lever 43 and push rod 41.

The opening through the boss 36 is closed at each end by a cover 45 which is detachably secured to the boss by screws 46. The detachable covers retain the roller 39 within the slot 37 and the former may be readily removed and replaced upon disconnection of either cover.

Figure 5:
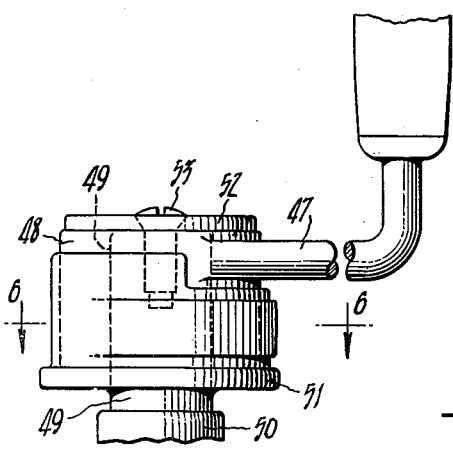
Fig. 5 is a side elevation of portion of a boring brace having releasable locking means for rotation in either direction.
Figure 6:
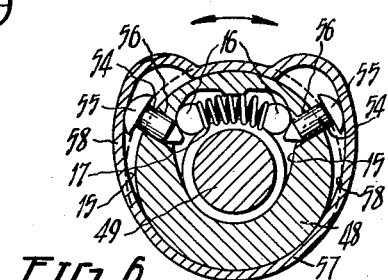
Fig. 6 is a transverse section on the line 6—6 of Fig. 5.

Referring now to Figs. 5 and 6, the numeral 47 designates the crank handle of the boring brace which is integral with a sleeve 48 rotatable upon and about the chuck shaft 49 fitted with a chuck 50 for drills and boring bits which is of usual construction and of which the upper end is shown in Fig. 5.

The sleeve 48 is supported upon a collar 51 formed on the chuck shaft 49 and is retained upon the latter by a cover plate 52 secured to the chuck shaft by a screw 53.

In the interior of the sleeve 48 there are formed ramps 15, and between the latter and the shaft 49 there are positioned spring-influenced locking rollers 16 as previously described.

If both rollers are urged by the spring into the angular spaces between the shaft 49 and the ramps 15, the sleeve 48 if rotated by the handle 47 in either direction will turn the shaft 49 in the same direction.

In order that the sleeve 48 may turn the shaft 49 in one direction but not in the other, i. e. to impart as it were a ratchet motion to the shaft 49, one or the other of the rollers 16 require to be released according to the desired direction of rotation or angular movement of the shaft.

For the purpose of disengaging the rollers 16, there are provided taper pointed thrust pins or plungers 54 which are formed with radiused heads 55 and are slidable in apertures 56 in the sleeve 48.

Rotatably fitted upon the sleeve 48 is a reversing sleeve 57 in the inner surface of which are formed cams or ramps 58, one of which upon manual rotation of the reversing sleeve engages one or the other of the plungers 54 and thereby forcibly disengages the corresponding roller 16, the other roller remaining in the locking position under influence of the spring 17.

Upon appropriate rotation or angular movement of the sleeve 48 by the handle 47, the locked roller will turn the clutch shaft in the desired direction, the other roller meanwhile remaining idle.

Upon the sleeve 57 being manually rotated to reengage the idle roller and disengage the active roller, it will be understood that the angular movements of the clutch shaft 49 will be reversed upon manual rotation of the handle 47 and sleeve 48 in the opposite direction.

I claim:

1. Coupling means for the purpose specified, comprising a movable cylindrical member, an encircling member surrounding the movable cylindrical member and having an interior of substantially oval form and greater sectional area than the movable cylindrical member, a substantially semi-cylindrical seating for the movable cylindrical member at one end of the oval interior of the encircling member, a pair of rollers disposed in spaced relation between the movable cylindrical member and the opposite end of the oval interior of the encircling member, resilient means disposed between the rollers and forcing the latter into wedged engagement with the movable cylindrical member and opposite surface portions of the oval interior of the encircling member tangential to the movable cylindrical member, said encircling member having apertures adjacent to the rollers, and manually actuated means mounted on the encircling member and operable through the apertures to release the rollers singly or in unison from wedged engagement.

2. Coupling means for the purpose specified, comprising a rotatable cylindrical member, a fixed housing surrounding the rotatable cylindrical member, and having an interior of substantially oval form and greater sectional area than said member, detachable covers on the ends of the housing, a bearing for the rotatable cylindrical member at one end of the oval interior of the housing, a pair of rollers disposed in spaced relation between the rotatable cylindrical member and the fixed housing, a spring interposed between the rollers and forcing the latter into wedged engagement with the rotatable cylindrical member and opposite surface portions of the interior of the housing tangential to said member, said housing having apertures adjacent the rollers, and manually actuated means mounted on the housing and operable through the apertures to release the rollers from wedged engagement.

3. Coupling means as claimed in claim 2, wherein the manually actuated means comprise a pair of levers pivotally supported upon the housing, and thrusting members carried by the levers extending through the apertures in the housing and operable by the levers to engage the rollers.

4. Coupling means as claimed in claim 2, wherein the apertures are threaded and the manually actuated means comprise tapered screws engaged with the threaded apertures and having slotted heads engageable by a locking spring fixed to the housing.

ALFRED A. H. N. SCOTT.

REFERENCES CITED

The following references are of record in the file of this patent:

UNITED STATES PATENTS

| Number | Name | Date |
|---|---|---|
| 342,586 | Deissler | May 25, 1886 |
| 771,951 | Wahlstrom | Oct. 11, 1904 |
| 2,253,168 | Burbridge | Aug. 19, 1941 |